(12) United States Patent
Margetis (10) Patent No.: US 10,577,119 B2
(45) Date of Patent: Mar. 3, 2020

(54) SYSTEM AND APPARATUS FOR REFUELING AIRCRAFT FROM A WATERCRAFT

(71) Applicant: Konstantinos Margetis, New York, NY (US)

(72) Inventor: Konstantinos Margetis, New York, NY (US)

(*) Notice: Subject to any disclaimer, the term of this patent is extended or adjusted under 35 U.S.C. 154(b) by 0 days.

(21) Appl. No.: 16/199,589

(22) Filed: Nov. 26, 2018

(65) Prior Publication Data

US 2019/0092487 A1 Mar. 28, 2019

Related U.S. Application Data

(63) Continuation of application No. 15/723,571, filed on Oct. 3, 2017, now Pat. No. 10,137,998, which is a
(Continued)

(51) Int. Cl.
*B64D 39/04* (2006.01)
*B64D 39/06* (2006.01)
(Continued)

(52) U.S. Cl.
CPC .............. *B64D 39/04* (2013.01); *B63B 27/24* (2013.01); *B63B 27/34* (2013.01); *B63G 8/001* (2013.01);
(Continued)

(58) Field of Classification Search
CPC ......... B63B 27/24; B63B 27/25; B63B 27/34; B63B 25/08; B63B 25/12; B63B 25/14;
(Continued)

(56) References Cited

U.S. PATENT DOCUMENTS

| 4,327,784 A | 5/1982 | Denniston |
| 4,753,400 A * | 6/1988 | Reuter ...................... B64F 1/02 244/110 R |

(Continued)

FOREIGN PATENT DOCUMENTS

| FR | 2568852 A3 | 7/1986 |
| GB | 2104014 A | 3/1983 |

(Continued)

OTHER PUBLICATIONS

GB Search Report Application No. 1602346.7, Date of Search Jul. 8, 2016.

*Primary Examiner* — Ajay Vasudeva
(74) *Attorney, Agent, or Firm* — Kramer Levin Naftalis & Frankel LLP (57) ABSTRACT

The invention is a watercraft to aircraft refueling system ("WARS"). A WARS is a refueling system based from a watercraft, such as a surface ship or submarine. A WARS would typically include an elevation apparatus to lift a refueling hose above the water. The elevation apparatus can compose a lifting or swiveling mechanism. In some embodiments both a lifting and swiveling mechanism is used. The WARS lifts the refueling hose above the water, allowing an aircraft to engage with the WARS. The refueling hose may also include a telescoping mechanism or a rotor apparatus or a pressurized water nozzle system to elevate the refueling hose and assist in engaging a WARS with an aircraft.

3 Claims, 11 Drawing Sheets

Related U.S. Application Data continuation-in-part of application No. 14/619,583, filed on Feb. 11, 2015, now Pat. No. 9,809,320.

(51) Int. Cl.
| | | |
|---|---|---|
| *B63B 27/34* | (2006.01) | |
| *B63G 8/00* | (2006.01) | |
| *B63B 27/24* | (2006.01) | |
| *B64D 39/00* | (2006.01) | |
| *B63B 25/08* | (2006.01) | |
| *B64C 39/02* | (2006.01) | |

(52) U.S. Cl.
CPC ............. *B64D 39/00* (2013.01); *B64D 39/06* (2013.01); *B63B 25/08* (2013.01); *B64C 39/022* (2013.01)

(58) Field of Classification Search
CPC .............. B63G 8/001; B63G 2008/002; B63G 2008/004; B63G 2008/005; B63G 2008/007; B63G 2008/008; B64D 39/00; B64D 39/02; B64D 39/04; B64D 39/06
See application file for complete search history.

(56) References Cited

U.S. PATENT DOCUMENTS

| | | | | |
|---|---|---|---|---|
| 5,326,052 | A * | 7/1994 | Krispin | B64D 39/06 244/135 A |
| 6,101,964 | A | 8/2000 | Lesesne | |
| 6,926,049 | B1 * | 8/2005 | Enig | B64D 39/04 137/615 |
| H2163 | H | 8/2006 | Mulhern | |
| 7,114,457 | B1 * | 10/2006 | Stiers | A63B 69/0093 114/253 |
| 7,458,543 | B2 | 12/2008 | Cutler et al. | |
| 8,220,746 | B1 * | 7/2012 | Stecko | B64D 39/06 244/110 R |
| 8,944,384 | B2 | 2/2015 | Travers et al. | |
| 9,809,320 | B2 | 11/2017 | Margetis | |
| 10,137,998 | B2 * | 11/2018 | Margetis | B64D 39/00 |
| 2004/0163581 | A1 | 8/2004 | Budnik | |

FOREIGN PATENT DOCUMENTS

| | | | | |
|---|---|---|---|---|
| GB | 2129382 A * | 5/1984 | ............ | B64D 39/00 |
| GB | 2129382 A | 5/1984 | | |

* cited by examiner

SYSTEM AND APPARATUS FOR REFUELING AIRCRAFT FROM A WATERCRAFT

RELATED APPLICATIONS

Continuation of currently pending application No. 2018/0044033, filed on Oct. 3, 2017, which is a Continuation-in-Part of application U.S. Pat. No. 9,809,320, filed on Feb. 11, 2015.

BACKGROUND

A common problem with operating aircraft is their limited range because of fuel consumption. Aircraft such as airplanes and helicopters, both manned and unmanned, have a range limited by the amount of fuel the aircraft holds. Extending an aircraft's range requires the aircraft to carry more fuel and limits the amount of equipment or cargo the aircraft can carry. Furthermore, carrying additional fuel may require modifications to the airframe of the aircraft that impair the aerial performance of the aircraft.

The limited range of aircraft is an issue of particular importance for military aircraft. Military aircraft use specific airports for refueling and may need to carry a significant amount of equipment that limits the amount of carried fuel. Military aircraft may also need to operate over an extended range when their airframes are optimized towards other aspects of aerial performance rather than range. Extending the range or flight time of military aircraft gives to the aircraft user a competitive advantage over an adversary. For example, extending the range of military aircraft allows those aircraft to engage the adversary from longer distances, reducing the need for airbases in the range of the aircraft of the enemy. Increasing flight time reduces the cost of maintaining a complement of aircraft running, as the same aircraft can perform longer missions. Therefore, in military applications, more range is almost always a welcome capability.

The need for extended range is particularly acute when the aircraft are operating over water environments, such as oceans, seas and lakes. The watercrafts operating as mobiles aircraft bases, such as aircraft carriers or amphibious ships, carry aircraft and are high value targets for the adversary. As such, it is advantageous to position them at great distances from the forces of the adversary, therefore imposing greater needs for range for the sea-based aerial vehicles. Moreover, the water environment limits the positioning of large, land-based, tanker aircrafts close to the area of operations, because airports may not be available in that area.

Based on the above, it becomes evident that a refueling system that would be based on water vehicles and could refuel aircraft it would be useful. Watercraft can typically develop a maximum speed of up to approximately 40 knots. Therefore, if a refueling system is placed on them, the air vehicle that is being refueled will need to have the capability to fly at such a low speed.

Conventional aircraft would stall (not able to produce lift and crash) at low speeds. Therefore, a watercraft based refueling system would only be able to refuel aerial vehicles that can hover or fly at low speeds. Such aerial vehicles include the helicopters, the tilt rotor aircrafts (such as the V22) and fighters with vertical/short take-off and landing capability such as the F35B and the AV-8 Harrier. Moreover, it is advantageous for the watercraft that carries the refueling system to limit its observability by the surveillance systems of an adversary. A stealthy refueling system could remain close to the area of operations without being exposed to an adversary.

An ideal combination of such a refueling system would be a submarine that is moving at periscope depth (few meters deep; thus it retains all the innate stealth characteristics of the submarines) that refuels a F35B, a stealth aircraft. Such a combination would allow the refueling of F35Bs very close to the area of operations with a low risk of being detected by an adversary. There is a need for a watercraft based refueling system (submarines, surface ships) that would be able to refuel aerial vehicles or small sea vehicles. Furthermore, there is a need for a system that can operate "stealthily" (low observability by an adversary).

SUMMARY OF THE INVENTION

The invention is a watercraft to aircraft refueling system ("WARS"). A WARS is a refueling system based from a watercraft, such as a surface ship or submarine. Larger watercraft are typically able to carry much greater fuel supplies and operate a much greater distances and lengths of time than aircraft or smaller watercraft. As such, it is advantageous to have a refueling system based on a watercraft and able to extend the range or operating time of aircrafts or smaller watercraft.

In the case of a WARS based from a submarine, the submarine would ascend to periscope depth to activate the WARS. A WARS would typically include an elevation apparatus to lift a refueling hose above the water. The elevation apparatus can compose of a lifting or swiveling mechanism. In some embodiments both a lifting and swiveling mechanism is used. In use, a WARS would lift the refueling hose above the water, allowing an aircraft to engage with the WARS. The refueling hose may also include a telescoping mechanism or a rotor apparatus to elevate the refueling hose and assist in engaging a WARS with an aircraft.

In some embodiments, a WARS uses some of the same, or similar, equipment used in the probe and drogue air refueling system. For example, a WARS can incorporate a drogue at the end of a fuel hose and to refuel an aircraft carrying a reciprocal probe. In this embodiment, the elevation mechanism portion of a WARS elevates the fuel hose and drogue above the water. The aircraft can then engage the drogue with its probe without being subjected to the adverse effects of a very low level flight over the water (e.g. waves that can enter the engine and cause engine malfunction). The watercraft carrying a WARS and the aircraft would match speeds while the system is being engaged for refueling. For example, the F35B and the V22 are existing aerial vehicles that can use the refueling system because they are capable of matching the speed of a watercraft. In some additional embodiments, the refueling system can be used to refuel sea vehicles that need to extend their range, such as the Landing Craft Air Cushion (LCAC).

A WARS can be placed on a submarine or a surface ship. In some embodiments, the main components are the fuel tank, the fuel pump, the fuel hose, the fuel hose reel, the elevation system, the drogue. A WARS can be in the form of: (1) an externally mounted system on a submarine, in a similar fashion to the SEAL delivery vehicles that are attached to the hull of submarines, (2) an internal system that is located inside the pressurized cabin or another compartment of a submarine and is extended outside the submarine through one of the periscope masts, (3) an system where some components are internal to the submarine and some are external, (4) a palletized system for rapid installation on surface vessels, (5) an equipment package such as those that are designed for the Littoral Combat Ship, or (6) a system fully integrated into the infrastructure of a surface ship.

A WARS can refuel aircraft that hover or fly at low speeds near those of the submarine or the surface watercraft. The aircraft capable of flying at this speed, are, for example, airplanes, tilt-rotor aircrafts, helicopters and can be manned or unmanned. Aircrafts currently in service compatible with the WARS include the F35B, the AV-8, the V-22, and helicopters equipped with the probe-and-drogue air refueling system.

A WARS can also be used to refuel sea vehicles that have a short range. The WARS can also be used to refuel watercraft, such as the Landing Craft Air Cushion (LCAC). The LCAC operates from big amphibious ships that constitute high priority targets for the enemy in an amphibious operation. The use of LCAC in combination with a WARS allows the amphibious ships to stay away from a landing shore for safety or for the element of surprise to the enemy.

The use of a WARS also has the advantage of a minimal number of rigid parts over the water, thereby minimizing the radar cross section of the system. This is advantageous when stealth during refueling is advantageous, especially in conjunction with stealth aircraft such as the F35B and submerged submarines carrying the WARS. Minimizing the number of rigid parts also increases safety, in case there is an inadvertent contact of the aerial vehicle that is being refueled with the WARS. The WARS can also have compact dimensions and be installed internally in watercraft such as submarines and surface ships. As the WARS has no large rigid components, its placement inside existing watercrafts may not require hull modifications to fit in the WARS and can be installed in existing watercraft with minimal modifications. Furthermore, components of a WARS can be designed to be single use, so that they can be jettisoned after use to reduce the amount of time the watercraft must surface, in the case of a submarine, an also reduce the complexity of the system.

BRIEF DESCRIPTION OF THE DRAWINGS

A better understanding of the present invention can be obtained from the following detailed description in conjunction with the following drawings, in which.

DETAILED DESCRIPTION OF THE PRESENT INVENTION

Figure 1A:
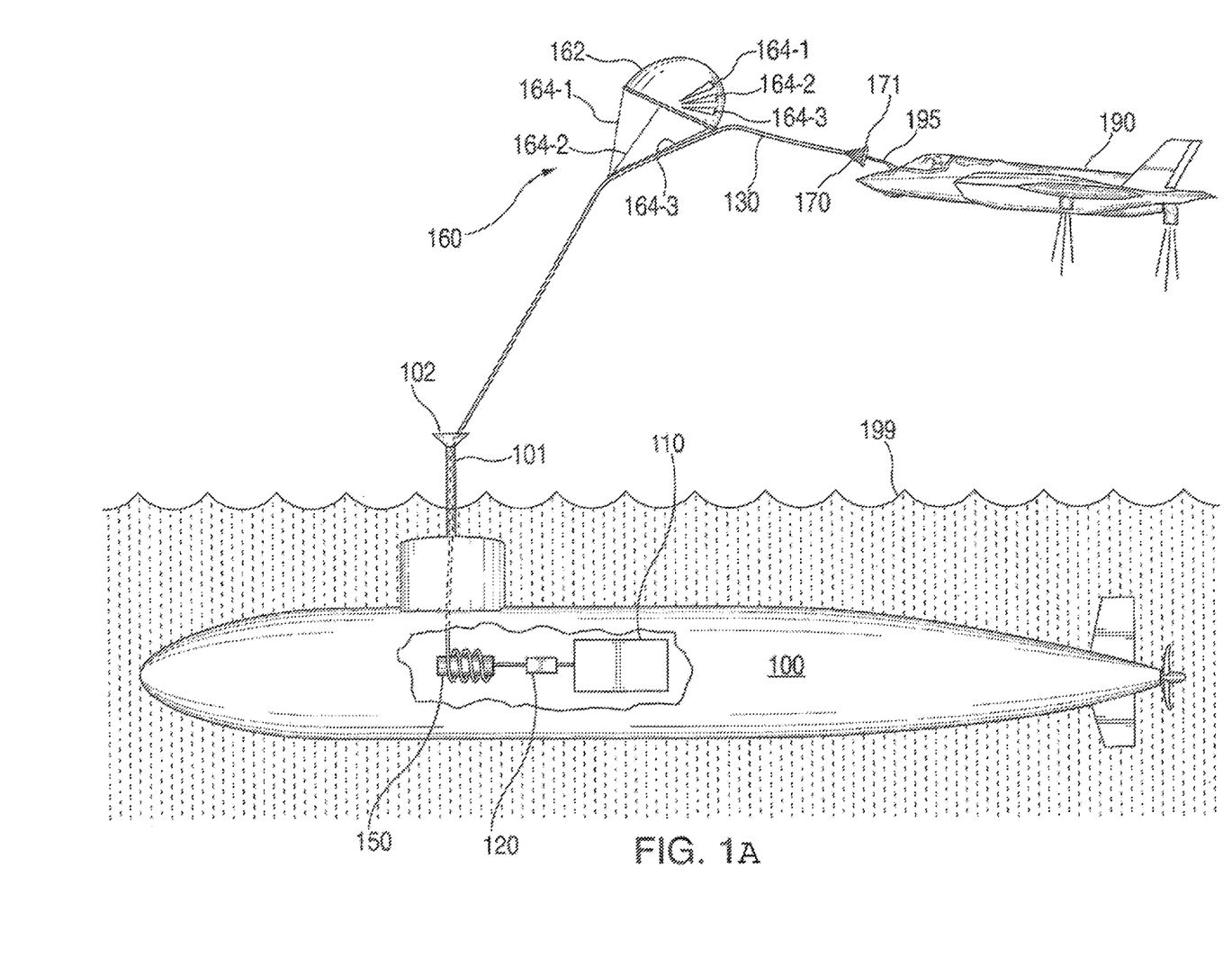
FIG. 1A depicts an embodiment of a watercraft employing a watercraft to aircraft refueling system with an aerodynamic lift.

FIG. 1A depicts an embodiment a watercraft 100 employing the WARS with an aerodynamic lift. In this example embodiment, the WARS is installed on the watercraft 100 and includes a fuel tank 110, a fuel pump 120, a fuel hose 130, a fuel hose reel 150, an aerodynamic lift apparatus 160, and a drogue 170. FIG. 1 depicts an aircraft 190 capable of hovering or flying at low speeds. The aircraft 190 includes a probe 195. The WARS depicted in FIG. 1 can be controlled through a panel included on watercraft 100, or can include a separate control device specific to the WARS.

The fuel tank 110 can be of an existing and known fuel tank design, either custom built for this purpose or by utilizing all or a portion of a preexisting fuel tank on the watercraft 100. The fuel carried in fuel tank 110 depends on the vehicle intended to be refueled. For example, the fuel tank can carry fuel to be used by an aircraft 190, or other aircraft or watercraft. In some example embodiments, the WARS will include multiple fuel tanks including multiple types of fuels to refuel multiple types of aircraft or watercraft. In these example embodiments, the WARS includes a control and valve system for selecting a fuel tank depending on the craft to be refueled. Furthermore, a control panel can be included for activating the WARS and selecting the correct fuel to be used.

The fuel pump 120 can be of an existing and known fuel pump design. The fuel pump 120 is preferably a high power system because in operation the fuel pump 120 is required to circulate fuel from the fuel tank 110 upwards into the elevated fuel hose 130 to reach the refueled aircraft 190. The watercraft 100 optimally includes sufficient power reserves to allow the functioning of a high power pump that is either electrical or hydraulic operated. In some example embodiments, multiple fuel pumps may be included, either as backup or to provide sufficient force to circulate fuel from the fuel tank to the aircraft. In other example embodiments where multiple fuel tanks are used, multiple fuel pumps are used corresponding to the different fuel tanks.

The fuel hose 130 is a fuel hose known and convenient for transferring aircraft fuel. Preferably, the fuel hose 130 has a diameter larger than compared with the fuel hoses used in similar aircraft-to-aircraft probe-and-drogue refueling systems because fuel hose 130 has fewer safety considerations for volume restrictions. The larger diameter of the fuel hose 130 reduces the resistance to the fuel flow, therefore enabling higher flow rates and/or reducing the fuel pump power requirements. The fuel hose 130 can also include a fuel valve integrated at the proximal end to allow the flow of fuel to be turned on or shutoff.

The fuel hose 130 is stored in the fuel hose reel 140. The fuel hose reel 150 allows the storage of the fuel hose 130 when the WARS is not in use. The fuel hose reel 150 also allows a specific length of fuel hose 130 to be extended for the optimal height given the particular conditions. The fuel hose reel 150 can be attached to motor or winch system allowing the fuel hose 130 to be extended or retracted. In operation, the fuel hose reel 150 will rotate from a motor or winch in one direction to cause the fuel hose 130 to extend. If the fuel hose reel 150 is to be retracted for stored a motor or winch will rotate the opposite direction to retract the fuel hose 130. The fuel hose 130 is wound around a spool component of the fuel hose reel.

The fuel hose 130 ends in the drogue 170 that can be similar to that used in the probe-and-drogue air-to-air refueling system. The drogue 170 is connected to the fuel hose 130. The drogue 170 has an inflatable rim 171 that allows for the deflation of the rim of the drogue 170 when the system is not in operation, and can transition to a compact form that can slide through the lumen of the submarine mast after the operation of the system. However, the inflatable rim 171 is optional and other types of rims may be used. The inflatable rim 171 can inflate through an integral air pump included in the drogue 170 or attached to the fuel hose 130 or installed in the watercraft 100. In other embodiments, the inflatable rim 171 can be inflated through the use of a canister of compressed air included as part of the drogue 170 or attached to the fuel hose 130 or installed in the watercraft 100.

The aerodynamic lift apparatus 160 is attached to the fuel hose 130. The aerodynamic lift apparatus 160 includes a canopy 162 that has openings 164-1, 164-2, and 164-3 to allow for the flow of air through the aerodynamic lift apparatus 160 to produce lift and thereby raise the fuel hose 130 into the air. The canopy 162 is connected to the fuel hose 130 by multiple lines 164-1, 164-2, and 164-3, allowing the canopy 162 to pull up the fuel hose 130. In some embodiments, the canopy 162 has a hemispheric shape, but any number or type of canopy 162 shapes known and convenient can be used. When the fuel hose 130 is extended over the water from the watercraft 100 the canopy 162 is filled with wind air and starts producing aerodynamic lift. The aerodynamic lift apparatus 160 thereby pulls the fuel hose 130 into the air above the water, allowing the aircraft 190 to engage with the drogue 170. A detailed view of the aerodynamic lift apparatus 160 can be seen in reference to FIG. 7 below.

When the system is in use, the fuel hose 130 runs into the hull of watercraft 100 through the mast 101. The mast 101 has a funnel shaped tip 102 to reduce the chances of malfunction and friction during the retraction of the fuel hose 130 and of the aerodynamic lift apparatus 160.

In some example embodiments, the aerodynamic lift apparatus 160 includes aspects that reduce the chance of failure or malfunction of the system. The canopy 162 can include a peripheral rim of a ring air cell. In operations, the canopy 162 is extended out of the mast 101, and the peripheral rim of the canopy 162 inflates, forcing the canopy 162 expands to its intended shape and produce lift. Furthermore, the canopy 162 optimally has the proper orientation when deployed to produce vertical lift toward the sky, and not lateral of downward force. A detailed view of the aerodynamic lift apparatus 160 is shown in reference to FIG. 7.

In embodiments where the canopy 162 includes a peripheral rim with a ring air cell, the ring air cell can inflate through an integral air pump included in the canopy 162 or attached to the fuel hose 130 or installed in the watercraft 100. In other embodiments, the ring air cell can be inflated through the use of a canister of compressed air included as part of the canopy 162 or attached to the fuel hose 130 or installed in the watercraft 100.

In one embodiment, the fuel hose 130 has an asymmetric or an oval shape and the lumen of the mast 101 has a similar shape allowing the fuel hose 130 to slide through. An asymmetric shape, such as an oval, keeps the fuel hose 130 in a specific orientation. As such, when the canopy 162 expands and begins to generate lift, the lift is vertical to elevate the fuel hose 130 above the water. An embodiment with an asymmetrical fuel hose is discussed in more detail in reference to FIG. 9.

In some embodiments, when the fuel hose 130 is retracted and stored, the canopy 162 can be collapsed and returned to a compact position for storage. First, the peripheral rim of the canopy 162 is deflated. Next, lines 164-1, 164-2, and 164-3 are retracted, but not at a uniform rate, but the length of retraction will depend on the point in the canopy each line is attached. This causes the canopy to have an elongated shape when retracted so as to avoid being filled with air and allowing the canopy 162 to be retracted safely inside the mast 101. The not homogenous retraction of lines 164-1, 164-2 and 164-3 is explained in FIGS. 7 and 8. The funnel shaped tip 102 of the mast 101 minimizes malfunctions during the retraction process. The canopy 162 can then be retracted inside the hull of the watercraft 100.

In further example embodiments, the drogue 170 and canopy 162 are single use components, and are jettisoned after use. In this example embodiment, the drogue 170 and canopy 162 would detach from the fuel hose 130, allowing the fuel hose 130 to be more rapidly retracted into the watercraft 100.

In some example embodiments, the aerodynamic lift apparatus 160 includes a steering mechanism allowing an operator to length or shorten the lines 164-1, 164-2, and 164-3 to position the aerodynamic lift apparatus 160. In this embodiment, the lines extend to the watercraft 100 along the fuel hose 130.

An aircraft 190 with the capability to fly at low speeds or hover is depicted. The aircraft 190 includes a probe 195. In some example embodiments, the probe is the same as used in the existing probe-and-drogue air refueling systems. The probe 195 is used in conjunction with the drogue 170.

While the watercraft 100 is depicted as a submarine, however a person of ordinary skill in the art would recognize that the WARS can be installed on surface watercraft.

In some example embodiments, the operation of the WARS in FIG. 1 is controlled through a processor system within the watercraft 100. The processor system can include an antenna for receiving radio commands on its operation, including when to deploy, how long to fuel, and when to finish refueling and retract.

Figure 1B:
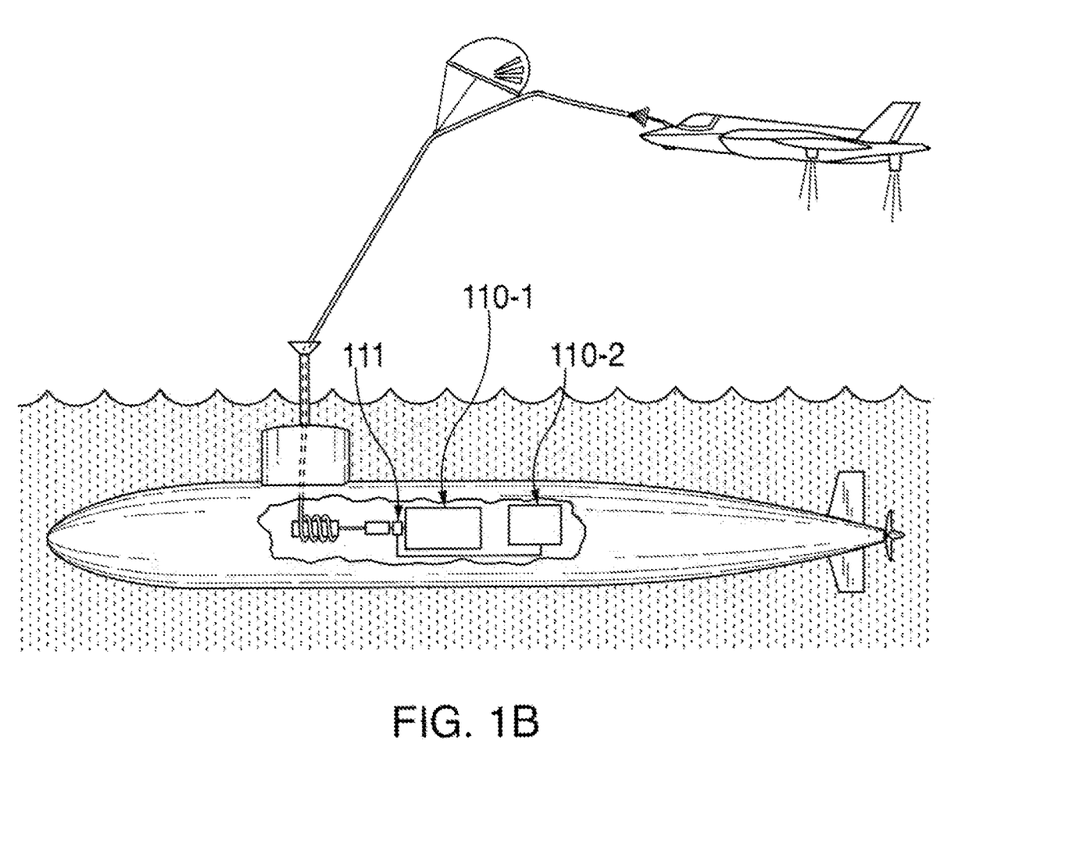
FIG. 1B depicts an embodiment of a watercraft employing a watercraft to aircraft refueling system with aerodynamic lift and two tanks for different fuels.

FIG. 1B depicts an embodiment of a watercraft employing a WARS with aerodynamic lift and two tanks for different fuels. The WARS described in FIG. 1B is similar with respect for most components to the WARS shown in FIG. 1A. However, FIG. 1B depicts a WARS with a valve 111, a first fuel tank 110-1 and a second fuel tank 110-2. The valve 111 is an electronically controlled valve that allows for the selection of either fuel in the first fuel tank 110-1 or the second fuel tank 110-2 so that more than one fuel type could be dispensed. In further embodiments, the WARS in FIG. 1B allows for a mixture of the fuels in the first fuel tank 110-1 and the second fuel tank 110-2 to be dispensed, depending on the requirements of the aircraft being refueled.

Figure 2:
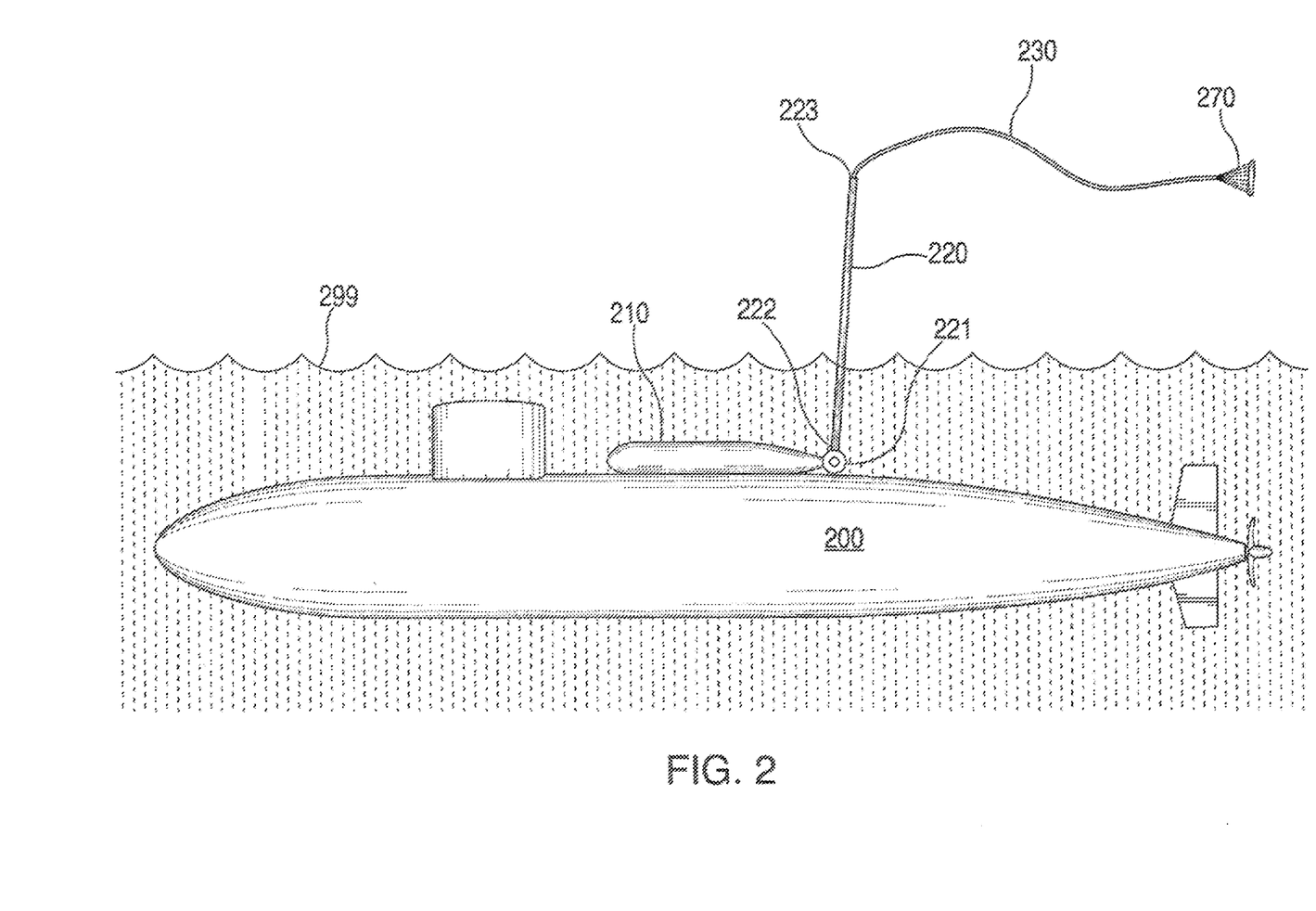
FIG. 2 depicts an example embodiment of a watercraft employing a watercraft to aircraft refueling system with a swiveling arm elevation mechanism.

FIG. 2 depicts an embodiment of a WARS with a swiveling arm elevation mechanism. A watercraft 200 carries an externally mounted device 210. The externally mounted device 210 includes a swiveling arm 220 that swivels around the swivel point 221. The externally mounted device 210 can include a fuel tank, fuel pump, and fuel hose reel, as described in reference to FIG. 1.

The externally mounted device 210 is preferably water tight and including a low profile design to reduce drag when the watercraft 200 is moving. The externally mounted device 210 has a smooth surface and is designed to be flush when attached to the watercraft 200 to reduce drag. The externally mounted device includes a skin composed of a water resistant material, such as a non-corrosive metal, plastic, or composite material. The externally mounted device includes an internal compartment for storing a fuel tank, fuel pump, and fuel hose reel.

When the swiveling arm 220 is in the operating position (shown in FIG. 2) the swiveling arm 220 is vertical to the long axis of the watercraft 200 to allow the distal end 223 of the swiveling arm 220 to reach the maximum height above the waterline while the WARS is in operation. The fuel hose 230 runs through the swiveling arm 220 and exits through the distal end 223. The swiveling arm 220 then tows the drogue 270 by the fuel hose 230. The drogue 270 is towed in the air above the watercraft 200 when the system is in operation.

The swiveling arm 220 has a proximal end 222 connected to the watercraft 200 at the swivel point 221. The fuel hose 230 extends out of the distal end 223 of the swiveling arm 220 and the fuel hose 230 ends with the drogue 270. The proximal part of the fuel hose 230 is internal to the swiveling arm 220 and connected with a fuel pump and fuel tank internal to the externally mounted device 210.

When the swiveling arm 220 swivels into the operating position, the distal end 223 of the swiveling arm 220 is raised above the watercraft 200. The swiveling arm 220 swivels at the swivel point 221. The swivel point 221 may be a hinge that allows the rotations of the swiveling arm 220. Preferably, the swivel point 221 is of waterproof construction and is coupled to a motor or other mechanism to raise the swivel arm 220 into the operating position.

The swiveling arm 220 also has a stowed position for when the WARS is not in operation. When not in use, the swiveling arm 220 is in a stowed position (not shown) and the swiveling arm 220 is parallel to the long axis of the watercraft 200 and allows for movement of a submersible watercraft with minimal water resistance. The swiveling arm 220 is stowed after being operated by swiveling the arm at the swivel point 221 from the vertical to the horizontal position.

Figure 4:
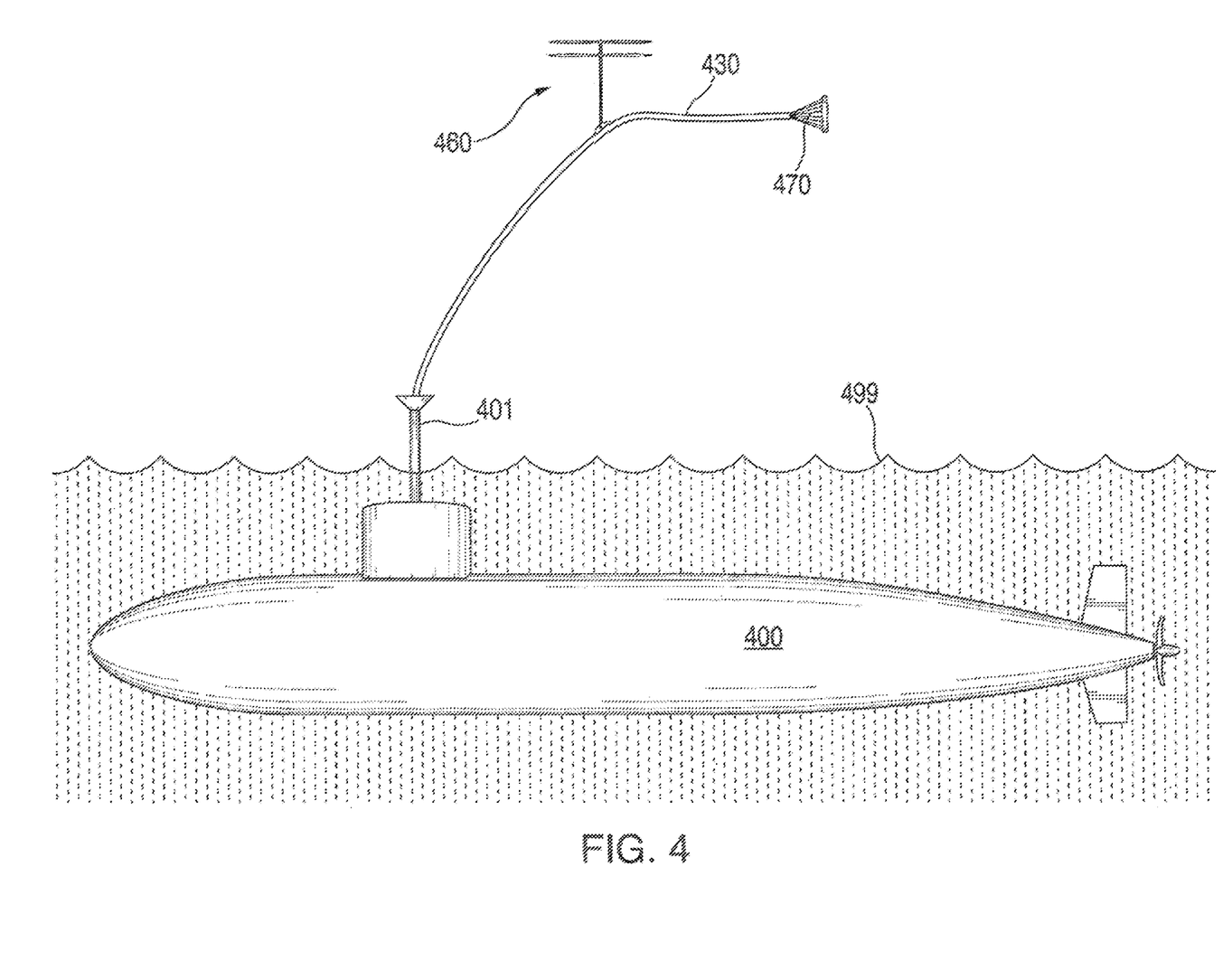
FIG. 4 depicts an example embodiment of a watercraft employing a watercraft to aircraft refueling system with a rotor elevation mechanism.
Figure 5:
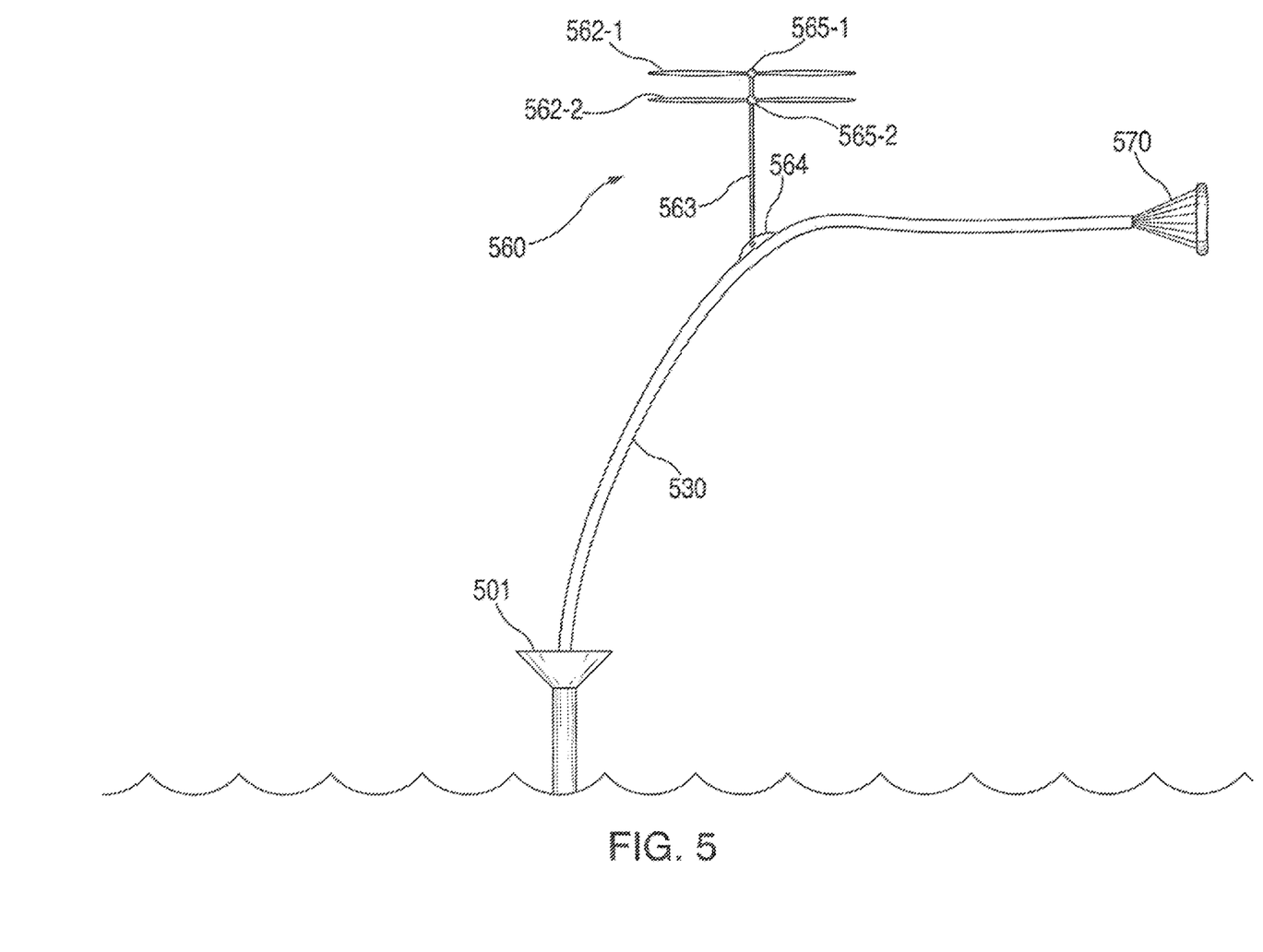
FIG. 5 depicts a rotor elevation mechanism for use in a watercraft to aircraft refueling system in the operating position.
Figure 6A:
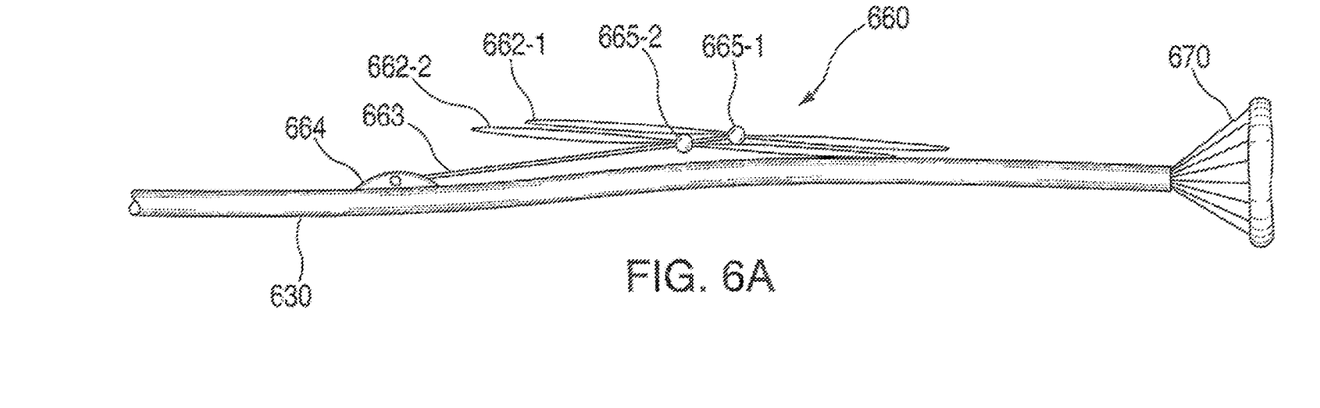
FIG. 6A depicts a lengthwise view of a rotor elevation mechanism for use in a watercraft to aircraft refueling system in the stowed position.
Figure 6B:
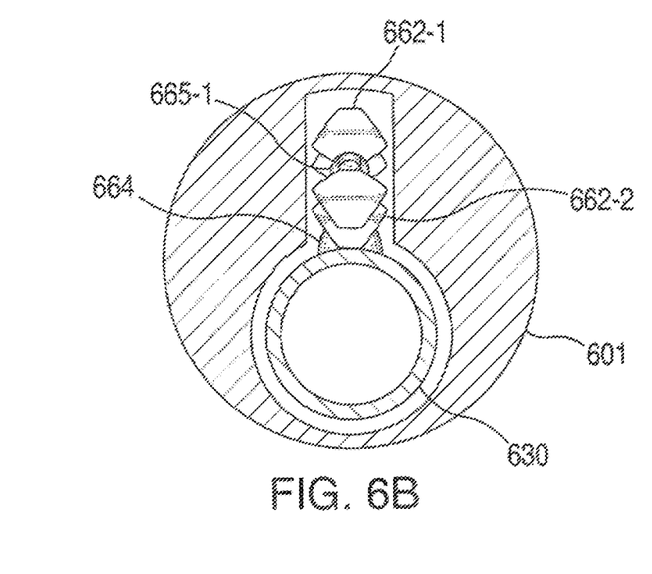
FIG. 6B depicts a cross section view of a rotor elevation mechanism for use in a watercraft to aircraft refueling system in the stowed position.
Figure 7:
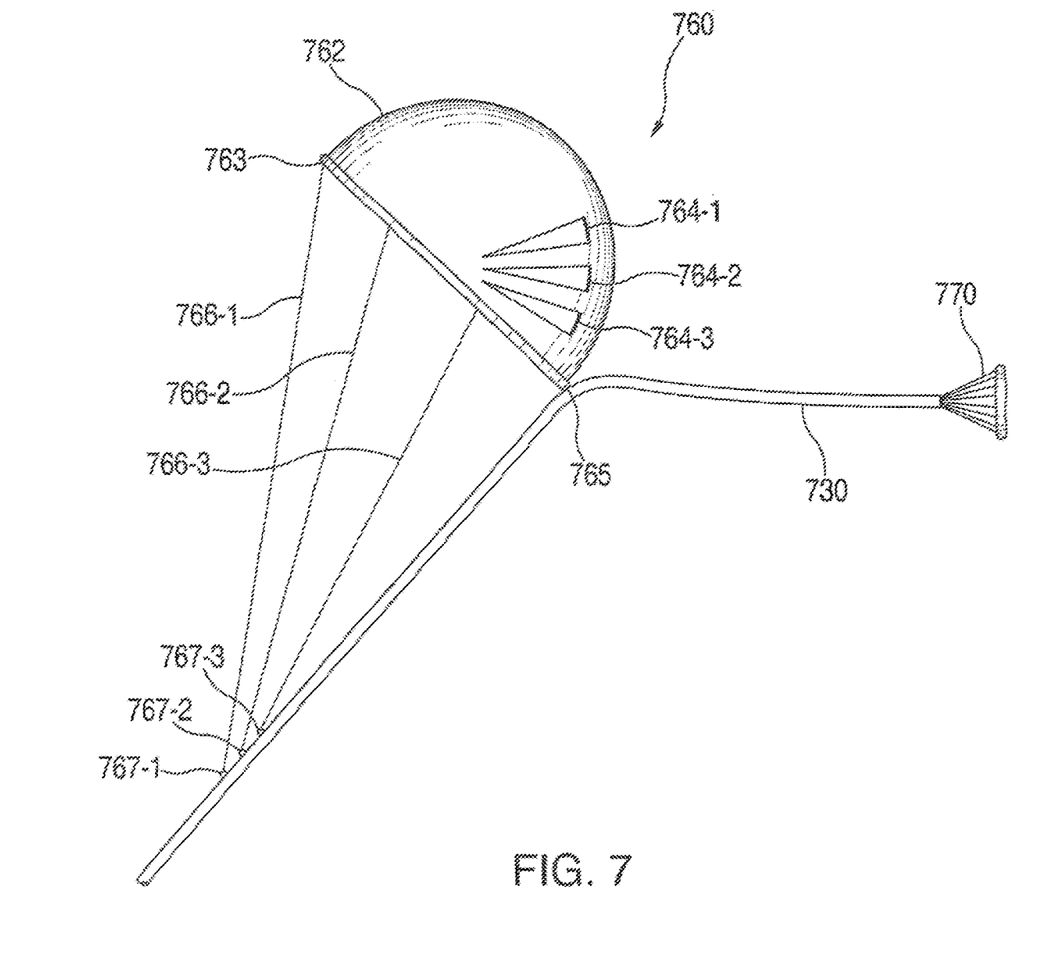
FIG. 7 depicts an aerodynamic lift elevation apparatus in operating position.
Figures 8, 9:
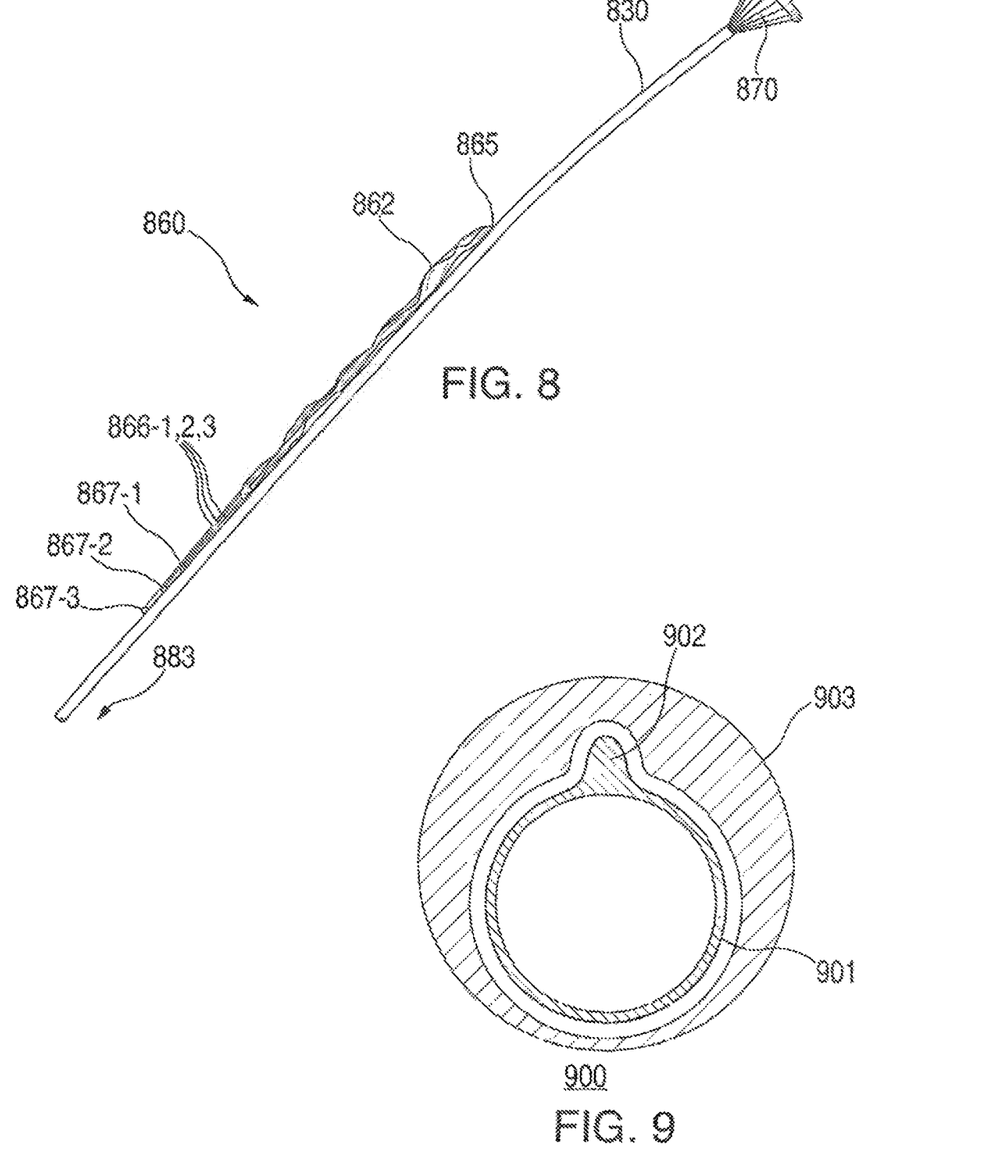
FIG. 8 depicts an aerodynamic lift elevation apparatus in stowed position.
FIG. 9 depicts the axial view across the longitudinal axis of the submarine mast with an asymmetrical cross section to orient a fuel hose.

In some example embodiments, the fuel hose 230 can also have an attached aerodynamic lift apparatus as described in reference to FIGS. 1, 7, and 8, or a rotor lift apparatus as described in referenced to FIGS. 4, 5, and 6.

In some example embodiments, the operation of the WARS in FIG. 2 is controlled through an internal processor system within the externally mounted device 210. The internal processor system can include an antenna for receiving radio commands on its operation, including when to deploy, how long to fuel, and when to finish refueling and retract.

Figure 3:
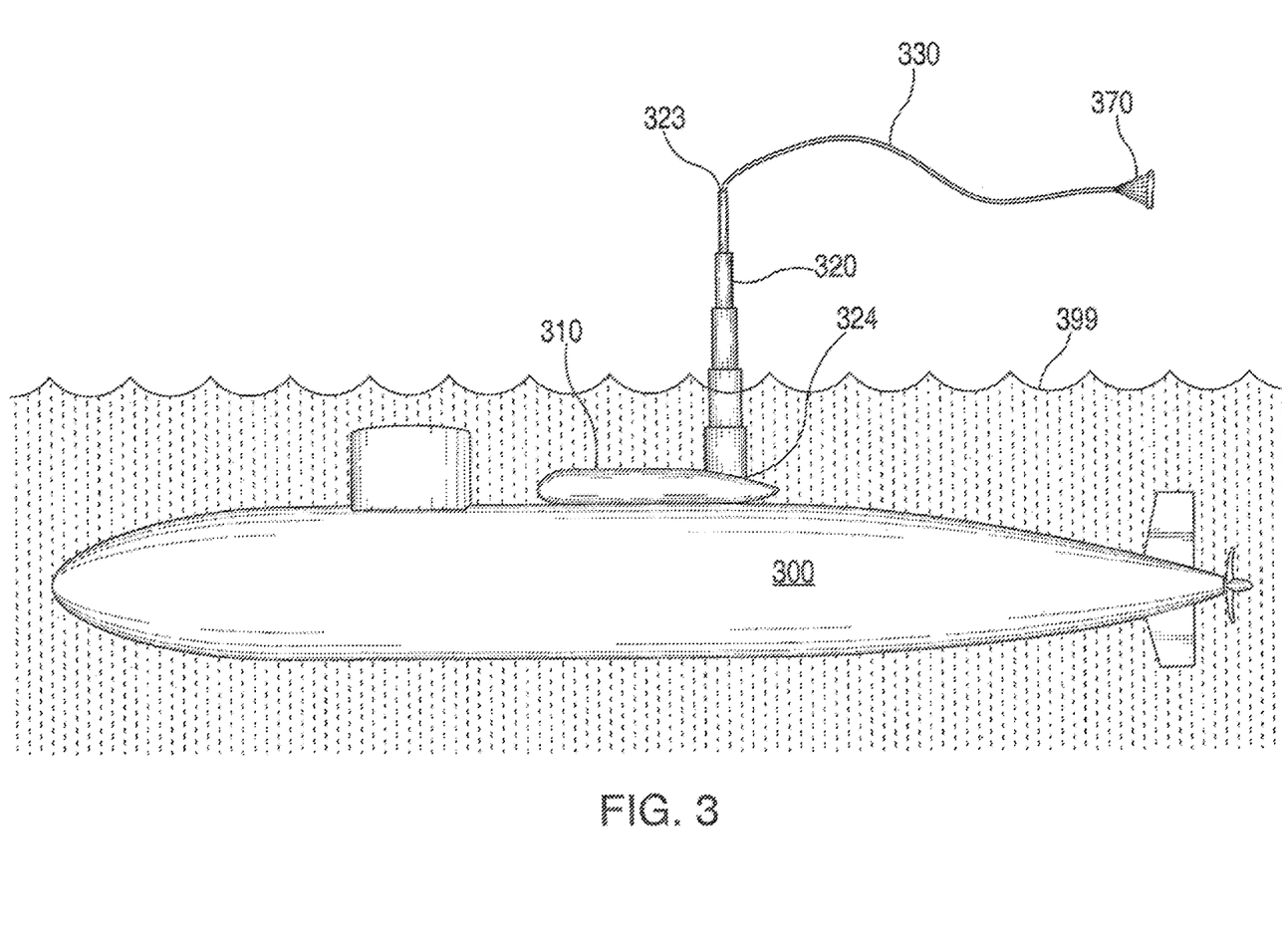
FIG. 3 depicts an example embodiment of a watercraft employing a watercraft to aircraft refueling system with a telescoping arm elevation mechanism.

FIG. 3 depicts and embodiment of the WARS with a telescoping arm elevation mechanism. A watercraft 300 carries an externally mounted device 310. The externally mounted device 310 can include a fuel tank, fuel pump, and fuel hose reel, as described in reference to FIG. 1.

The externally mounted device 310 has a telescoping arm 320 that extends upwards. When the telescoping arm 320 is in the operating position (shown in FIG. 3) the telescoping arm 320 extends upwards to allow the distal end 323 of the telescoping arm 320 to reach the maximum height. The distal end 323 tows the fuel hose 330 that ends to the drogue 370.

The telescoping arm 320 has stowed position and an operating position. When the telescoping arm 320 extends to the operating position, the distal end 323 attains an elevated position, typically above the water line when in use. The telescoping arm 312 has a proximal end 324 connected to the watercraft 300 and a distal end 323 where the fuel hose 330 is attached. The fuel hose 330 exits through the distal end 323 of the telescoping arm 320 and the fuel hose ends with a connected drogue 370 towed in the air. The proximal part of the fuel hose 330 can be internal to the telescoping arm 312 and connected with a fuel pump and fuel tank internal to the externally mounted device 310. The externally mounted device also includes a mechanism to activate the telescoping mechanism of the telescoping arm 320.

When the telescoping arm 320 is in stowed position the telescoping arm 320 is completely or almost completely stowed internal to the externally mounted device 310 to allow movement with minimal water resistance.

In some example embodiments, the fuel hose 330 can also include an attached aerodynamic lift apparatus as described in reference to FIGS. 1, 7, and 8, or a rotor lift apparatus as described in referenced to FIGS. 4, 5, and 6.

FIG. 4 depicts an example of the WARS with a rotor elevation mechanism. The system disclosed in FIG. 4 includes the same components as described in FIG. 1, but instead of an aerodynamic lift apparatus as shown in FIG. 1, a rotor lift apparatus 460 is used to lift the fuel hose 430. A watercraft 400 has a mast 401. A fuel hose 430 exits from and is towed by the mast 401. The fuel hose 430 has an attached rotor lift apparatus 460. The rotor lift apparatus 460 contains a double, counter-rotating blade rotor mechanism. The fuel hose 430 has at its distal end the drogue 470. Detailed views of the rotor lift apparatus 460 are shown in reference to FIGS. 5 and 6.

When the WARS is activated, the rotor lift apparatus 460 emerges from the water (in the case of a submarine based WARS) through the mast 401. The rotor lift apparatus 460 activates its blades and lifts the fuel hose 430 above the water. The rotor lift apparatus 460 can have several forms, including double, counter-rotating rotors. The double, counter-rotating rotor blades can be stowed inside the mast 401 by swiveling the rotor blades vertically and collapsing the rotor lift apparatus 460. Detailed views of this collapsible design for the rotor lift apparatus can be seen in reference to FIGS. 5 and 6.

The rotor lift apparatus 460 includes a motor apparatus for rotating the blades of the rotor. In some example embodiments, the motor is integral to the rotor lift apparatus 460 and is activated through radio signals or a wire running the length of the fuel hose 430. The motor apparatus can be electrical with electrical power provided by the watercraft 400 through a wire running along the fuel hose 430. The motor can also be pneumatic or hydraulic powered by powered provided from the watercraft 400; the power would be transferred through hydraulic or pneumatic circuits running along the fuel hose 430. The rotor lift apparatus 460 can also include a electronic circuitry for operations of the rotor lift apparatus 460. In some additional embodiments, the rotor lift apparatus includes an integral gyroscope used to stabilize the rotor lift apparatus 460 while in use. Preferably, when a gyroscope is used, the rotor lift apparatus 460 will also include a processor for processing sensor data from the rotor lift apparatus 460 to maintain stability while in flight.

In one further example embodiments, a multiple rotors design can be used for the rotor lift apparatus, such as a quad copter design. A quad copter design doesn't require the complex gear mechanism that the counter rotating design requires for swiveling the blades to collapse the rotor lift apparatus and to vary the pitch of the rotor blades during the operation of the rotor. However, as the blades would not collapse in the quad copter design is thereby typically more bulky than using double, counter-rotating blades, but may still be optimal for a particular application, based on the increased lift that may be generated from such a design or the reduced costs associated with the design.

FIG. 5 depicts an example of the rotor elevation mechanism in the operating position. A mast 501 of a watercraft tows a fuel hose 530. The fuel hose 530 has incorporated a rotor lift apparatus 560, which contains a double, counter-rotating blade rotor mechanism, including top rotor blade 562-1 and lower rotor blade 562-2. The rotor blades 562-1 and 562-2 are connected to the fuel hose 530 by a pillar 563 that can swivel at swivel point 564. The blades 562-1 and 562-2 on the rotor can also swivel around rotor blade swivel points 565-1 and 565-2. The swiveling points 565-1, 565-2 allow the stowing of the rotor blades 562-1, 562-2 along and parallel to the pillar 563. The swiveling point 564 allows the stowing of the pillar 563 alongside and almost parallel to the fuel hose 530. The fuel hose 530 has at its distal end the drogue 570. The rotor elevation mechanism depicted in FIG. 5 can be used in the WARS shown in reference to FIG. 4.

FIG. 6A depicts a lengthwise view of details of an example of the rotor elevation mechanism in the stowed position. The fuel hose 630 has an integrated rotor elevation apparatus 660. The two blades of the rotor elevation mechanism 662-1, 662-2 have swiveled around swivel points 665-1 and 665-2 to attain the stowed position shown in FIG. 6, where the blades have been collapsed and are almost parallel to the pillar 663. The pillar 663 has swiveled around point 664 to attain the stowed position, almost in parallel to the fuel hose 630. The fuel hose 630 has at its distal end the drogue 670. The rotor elevation mechanism depicted in FIG. 6 can be used in the WARS shown in reference to FIG. 4.

FIG. 6B depicts a cross section view of details of an example of the rotor elevation mechanism in the stowed position inside a watercraft mast 601. The fuel hose 630 is depicted in cross section for clarity purposes. The two blades of the rotor elevation mechanism 662-1, 662-2 have swiveled around swivel points. The swivel point of blade 662-1 is depicted as 665-1, while the swivel point for blade 662-2 is not shown because it is covered by blade 662-1. The swivel point of the pillar described in FIG. 5 is also depicted 664. The rotor elevation mechanism depicted in FIG. 6 can be used in the WARS shown in reference to FIG. 4.

FIG. 7 depicts an aerodynamic lift apparatus in operating position. The fuel hose 730 has at its distal end the drogue 770. The proximal end of the fuel hose 730 is connected to a watercraft (not shown). The fuel hose 730 has attached an aerodynamic lift elevation apparatus 760. The aerodynamic lift apparatus 760 consists of a canopy 762 that has some openings 764-1, 764-2, and 764-3 to allow for the flow of air through the aerodynamic lift apparatus and the production of lift. The canopy 762 has a hemispheric shape. In alternative embodiments, other shapes can be used that are known and convenient. The canopy 762 has a peripheral rim 763 with an inflatable cell. The canopy 762 is connected to the fuel hose at attachment point 765. The canopy 762 is also connected to the fuel hose 730 by multiple lines 766-1, 766-2, and 766-3 that are attached to the fuel hose through the connectors 767-1, 767-2, and 767-3. The picture shows the lines of just one side of the apparatus and additional lines symmetric to the lines depicted would be in use on the other side of the canopy 762.

The aerodynamic lift apparatus 762 is depicted in the operating position. When the aerodynamic lift apparatus 762 transitions to the stowed position, the peripheral rim 763 is deflated. Then, the lines are retracted through the corresponding connectors. The objective is to attain an elongated form of the canopy that would not be getting filled with air and that would allow the retraction of the canopy through the lumen of the submarine mast. In order to achieve the elongated form, the line 766-1 needs to get retracted more than the line 766-2, because the line 766-1 is longer than the line 766-2. An additional reason for more retraction of the line 766-1 compared with line 766-2 is that the point where the line 766-1 attaches to the canopy needs to get closer to the connector 767-1 compared with line 766-2 and connector 767-2. We call this different retraction of the lines as non-homogenous retraction. This not-homogenous retraction allows the canopy to get a more elongated shape in the stowed position; this shape would allow the insertion of the canopy into the lumen of the submarine mast (not shown).

FIG. 8 depicts an aerodynamic lift elevation mechanism in stowed position. The fuel hose 830 has at its distal end the drogue 870. The proximal end 833 of the fuel hose 830 is connected to a watercraft. The canopy 862 is connected to the fuel hose at the point 865. The canopy 862 is connected to the fuel hose 830 by multiple lines 866-1,2,3 that are attached to the fuel hose 830 through the connectors 867-1, 867-2, and 867-3. The lines have been retracted through the connectors. The lines have been retracted not-homogenously (as it is described in FIG. 8), in order the canopy 862 to get a more elongated shape in the stowed position. This shape allows the insertion of the canopy into the lumen of the submarine mast (not shown).

FIG. 9 depicts the axial view cut across the longitudinal axis of the submarine mast with an asymmetrical cross section to orient a fuel hose. The mast 900 has a hollow lumen for a fuel hose 901. The cross section of the mast is depicted 903. The design of this lumen/hose combination allows the maintenance of the proper orientation of a fuel hose towards the anterior end of the submarine. The lumen has a recess that receives a fin 902 that runs the length of the fuel hose 901. The combination of fin on the fuel hose and a recess prohibits rotation of the fuel hose inside the lumen of the mast 900; therefore when the fuel hose is extended over the mast 900, the aerodynamic lift apparatus is on the same direction as the fin and it can be deployed optimally. This mast design can be used in conjunction with the systems described in FIGS. 1, 2, 3, 4, 5, 10A, and 10B. The fin can contain electrical power wires, hydraulic or pneumatic circuits, the lines that are connected to the canopy, communication wires.

Figure 10A:
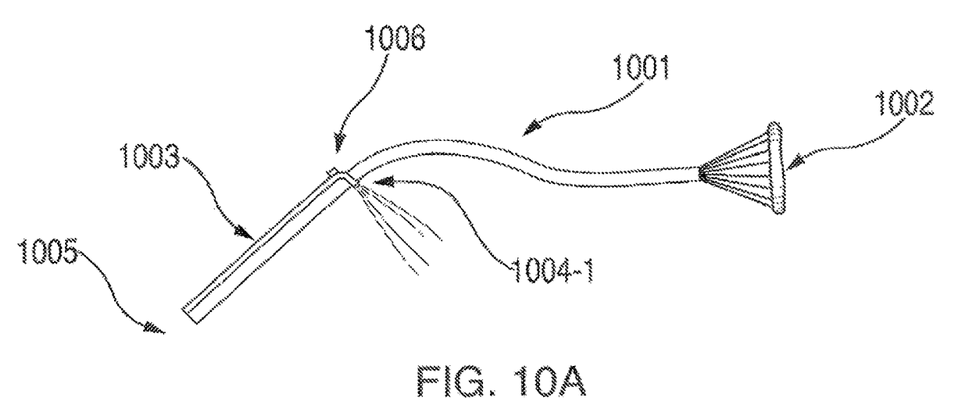
FIG. 10A depicts a side view of a water elevation mechanism.

FIG. 10A depicts a side view of a water elevation mechanism for use with a WARS. The water elevation mechanism 1006 includes a water line 1003 and water nozzle 1004-1.

The water elevation mechanism 1006 is attached to fuel hose 1001. The water line 1003 runs the length of the fuel hose 1001 and it is connected to the watercraft along with the fuel hose 1001 at point 1005. The water line 1003 has a hollow lumen for water to be pumped through the water line 1003 and expelled from the water nozzle 1004-1. The watercraft can collect water from the water that the watercraft is operating on, such as an ocean, sea, lake, or river. This provides an upward force on the fuel hose 1001 at the water nozzle 1004-1. This lifts up the fuel hose 1001 and the attached drogue 1002, allowing it to be used for refueling as described in reference to FIGS. 1, 2, 3, 4, and 5.

Preferably, the water elevation mechanism 1006, and in particular the water nozzle 1004-1 is located a necessary distance away from the drogue 1002 that the spray from the water nozzle 1004-1 would not endanger an aircraft attempting to refuel at the drogue 1002.

Figure 10B:
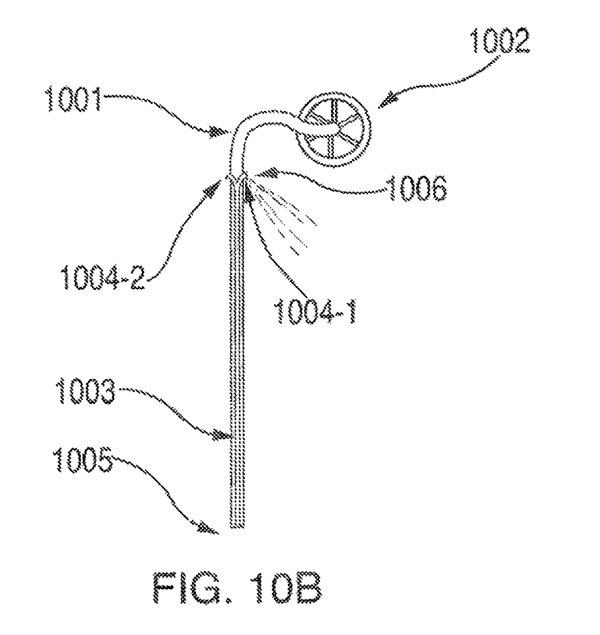
FIG. 10B depicts an anterior view of water elevation mechanism.

FIG. 10B depicts an anterior view of water expulsion elevation mechanism for use with a WARS. FIG. 10B depicts the same water elevation mechanism as in FIG. 10A, but shows that the system includes a second water nozzle 1004-2 for expelling water from the water elevation mechanism 1006. In some example embodiments, the nozzles 1004-1 and 1004-2 include a mechanism for directing the expulsion of water, allowing the orientation of the fuel hose 1001 and drogue 1002 along with the aircraft that is being refueled. A sensor suite can be placed in the water expulsion elevation mechanism 1006, and can include sensors such as accelerometers, gyroscopes, altimeters, or cameras to guide the fuel hose 1001 and drogue 1002. The water expelled can be controlled through a remote operating system through wired or wireless communications. In some example embodiments, the water is controlled through an automated system included in the water elevation mechanism 1006.

Figure 11A:
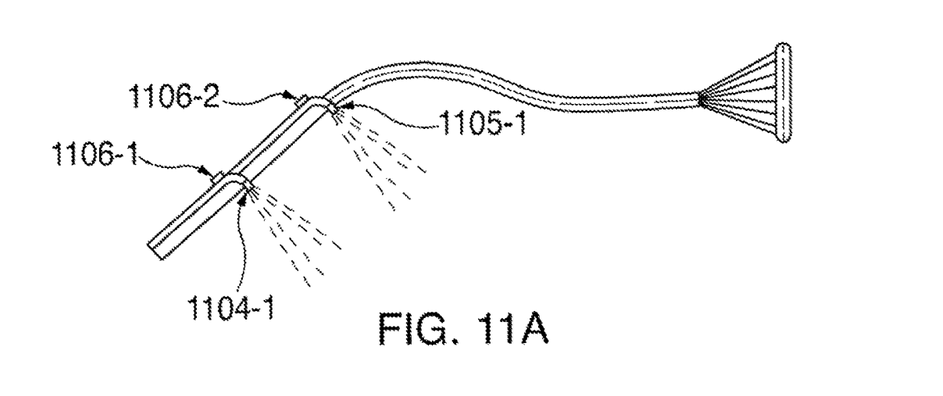
FIG. 11A depicts a side view of a water elevation mechanism with a sensor suit and two directionally controlled nozzles.

FIG. 11A depicts a side view of a water elevation mechanism with a sensor suit and two directionally controlled nozzles. The water elevation mechanism depicted in FIG. 11A is similar to that in FIG. 10A, except that it includes a first water elevation mechanism 1106-1 with a first water nozzle 1104-1 and a second water elevation mechanism 1106-2 with a second water nozzle 1105-1, with each water elevation mechanism located at different locations on the fuel hose. Including two water nozzles allows greater control of the fueling hose and drogue during the refueling process, as each can be independently controlled. The water elevation mechanisms 1106-1 and 1106-2 include an integrated sensor suite, and can include sensors such as accelerometers, gyroscopes, altimeters, or cameras to guide the fuel hose and drogue.

Figure 11B:
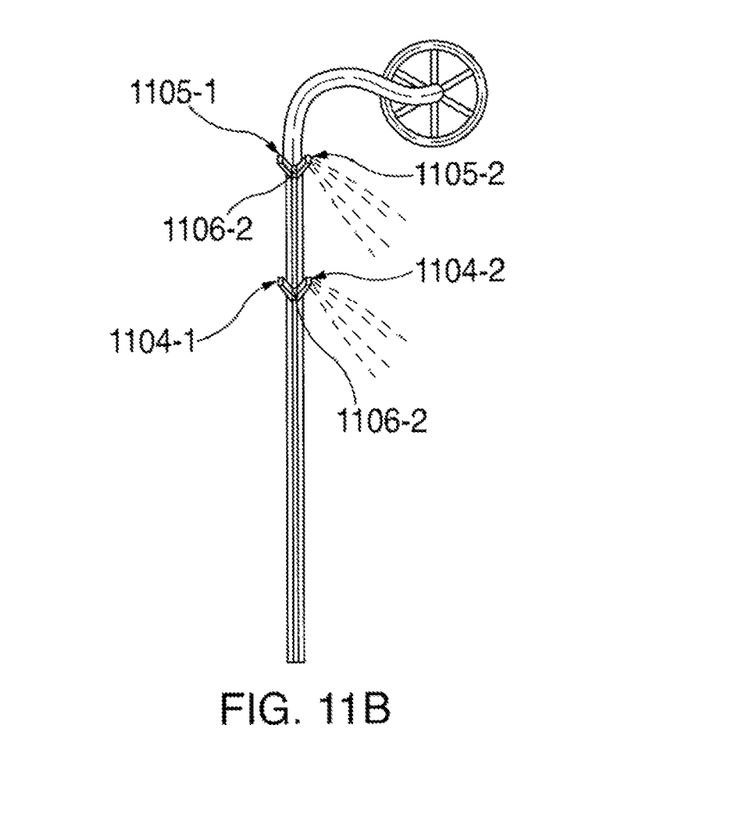
FIG. 11B depicts an anterior view of a water elevation mechanism with a sensor suit and two directionally controlled nozzles.

FIG. 11B depicts an anterior view of a water elevation mechanism with a sensor suit and two directionally controlled nozzles. The water elevation mechanism depicted in FIG. 11B is similar to that in FIG. 10B, except that it includes a first water elevation mechanism 1106-1 with a first water nozzle 1104-1 and a second water nozzle 1104-2 and a second water elevation mechanism 1106-2 with a first water nozzle 1105-1 and a second water nozzle 1105-2.

In reading the above description, persons skilled in the art will realize that there are apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded as illustrative rather than restrictive. Furthermore, a person of ordinary skill in the art would understand that aspects related to a specific embodiment can also be applied to other disclosed embodiments.

What is claimed is:

1. A watercraft to aircraft refueling system, comprising:
   a fuel tank configured to hold an aircraft fuel;
   a fuel hose reel;
   a fuel hose configured to connect to the fuel tank to allow fuel to flow from the fuel tank through the fuel hose, wherein the connection is controlled by a valve;
   a drogue attached to the fuel hose; and
   an aerodynamic lift elevation mechanism including a canopy with a plurality of openings attached to the fuel hose, a plurality of lines connected to the canopy and attached to the fuel hose at a plurality of locations;
   a mast from which the fuel host extends, where the mast is a periscope mast;
   wherein, the fuel tank, fuel hose, drogue, aerodynamic lift elevation mechanism and mast are configured to operate from a submerged watercraft and the aerodynamic lift elevation mechanism is operable to lift the fuel hose and drogue into the air when being towed by the submerged watercraft with the mast extending above the water;
   wherein the mast is operable to extend from the submerged watercraft to above a waterline; and
   wherein the fuel tank and fuel hose reel are internal to a pressurized compartment of the submerged watercraft.

2. A watercraft to aircraft refueling system as in claim 1, wherein the drogue includes an inflatable rim.

3. A watercraft to aircraft refueling system as in claim 1, including a first nozzle and a second nozzle for expelling water.

* * * * *